United States Patent
Pinhack et al.

(10) Patent No.: US 8,894,822 B2
(45) Date of Patent: Nov. 25, 2014

(54) ROTARY EVAPORATOR

(75) Inventors: Hubert Pinhack, Bad Krozingen (DE); Martin Spath, Staufen (DE)

(73) Assignee: Ika-Werke GmbH & Co. KG, Staufen (DE)

( * ) Notice: Subject to any disclaimer, the term of this patent is extended or adjusted under 35 U.S.C. 154(b) by 903 days.

(21) Appl. No.: 13/122,848

(22) PCT Filed: Aug. 29, 2009

(86) PCT No.: PCT/EP2009/006277
§ 371 (c)(1),
(2), (4) Date: Apr. 6, 2011

(87) PCT Pub. No.: WO2010/043283
PCT Pub. Date: Apr. 22, 2010

(65) Prior Publication Data
US 2011/0192710 A1    Aug. 11, 2011

(30) Foreign Application Priority Data
Oct. 15, 2008  (DE) .......................... 10 2008 051 364

(51) Int. Cl.
*B01D 3/08* (2006.01)
*B01D 3/42* (2006.01)
*B01D 5/00* (2006.01)

(52) U.S. Cl.
CPC *B01D 3/085* (2013.01); *B01D 3/42* (2013.01); *B01D 5/0006* (2013.01); *B01D 5/0045* (2013.01); *B01D 5/0051* (2013.01); *B01D 5/006* (2013.01)
USPC ........... 203/2; 203/91; 202/185.1; 202/185.4; 202/185.6; 202/238; 159/25.1; 159/47.1

(58) Field of Classification Search
CPC ........ B01D 3/08; B01D 3/085; B01D 5/0006; B01D 5/006

USPC ................ 202/175, 185.1, 185.4, 185.6, 238; 203/2, 91; 159/25.1, 47.1
See application file for complete search history.

(56) References Cited

U.S. PATENT DOCUMENTS 2,224,621 A  *  12/1940  Voorhees ........................ 203/89
2,608,528 A  *   8/1952  Piros et al. .................... 202/158

(Continued)

FOREIGN PATENT DOCUMENTS

DE      3718791      12/1987
DE     19803711       8/1999

(Continued)

OTHER PUBLICATIONS

M.T. Kramer, A Rotary Evaporator System and its Potentials, G-I-T-Fachz. Lab, 18th Volumne, Sep. 1974, pp. 862-868.

*Primary Examiner* — Nina Bhat
*Assistant Examiner* — Jonathan Miller
(74) *Attorney, Agent, or Firm* — Volpe and Koenig, P.C.

(57) ABSTRACT

A rotary evaporator (1) having a cooler (6), wherein temperature sensors (15, 17) are disposed in the inlet (14) and outlet (16) of the coolant into or out of the cooler (6), and a volume flow rate of the coolant through the cooler (6) is determined. The initiation or termination of condensation in the cooler (6) is derived from an increase or decrease in the difference of the temperatures (X) at the temperature sensors (15, 17). The volume of the condensed distillate (10) is determined from the difference in temperatures (X), and a distillation volume control is performed. By regulating the heating power of the heater (11) and/or the pressure in the system, the loading of the cooler (6) is controlled as a function of the difference in temperatures (X).

16 Claims, 1 Drawing Sheet

(56) References Cited

U.S. PATENT DOCUMENTS

| | | | |
|---|---|---|---|
| 4,246,070 A * | 1/1981 | Hofferber | 196/132 |
| 4,289,588 A * | 9/1981 | Hofferber | 203/2 |
| 4,780,178 A * | 10/1988 | Yoshida et al. | 159/6.1 |
| 4,790,911 A * | 12/1988 | Parkinson | 202/205 |
| 5,472,575 A * | 12/1995 | Parkinson et al. | 202/205 |
| 5,853,671 A * | 12/1998 | Lieberam | 422/112 |
| 5,976,323 A * | 11/1999 | Milde et al. | 203/2 |
| 8,470,137 B2 * | 6/2013 | Publ et al. | 202/160 |
| 8,470,138 B2 * | 6/2013 | Publ et al. | 202/160 |
| 8,506,761 B2 * | 8/2013 | Publ et al. | 202/160 |
| 2006/0210405 A1 * | 9/2006 | Fuksa et al. | 417/306 |

FOREIGN PATENT DOCUMENTS

| | | |
|---|---|---|
| EP | 0236813 | 2/1987 |
| WO | 9605901 | 2/1996 |

* cited by examiner

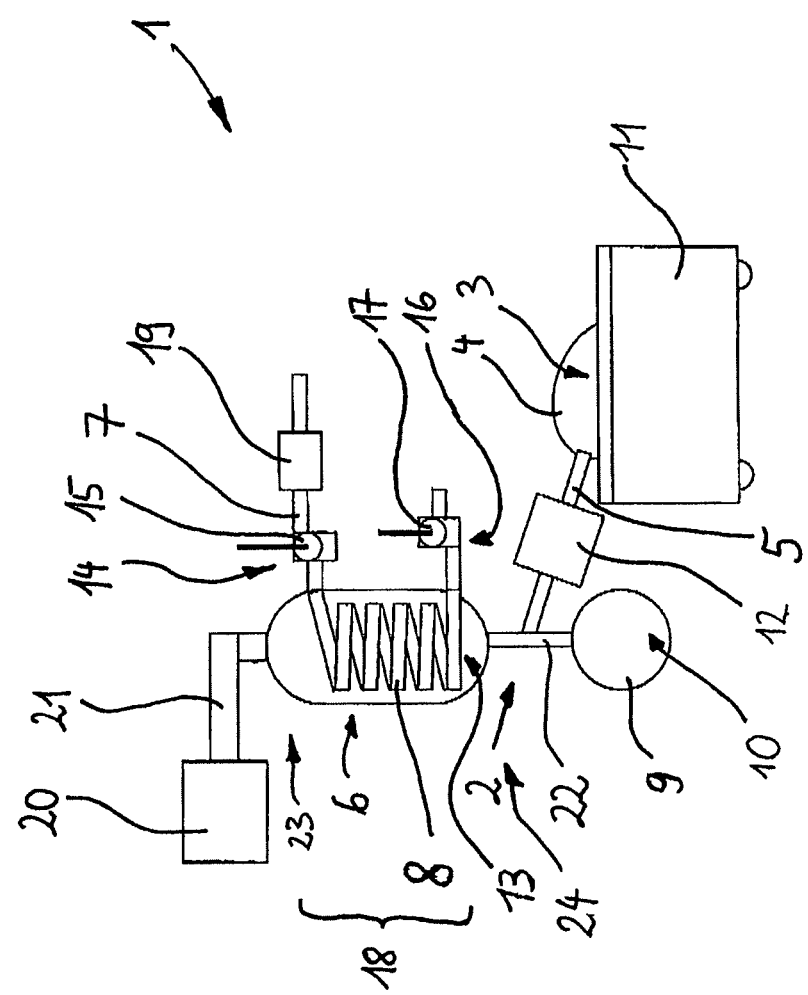

ROTARY EVAPORATOR

BACKGROUND

The invention relates to a rotary evaporator having a distilling flask, receiving a distillate and supported rotationally around an axis, which comprises a vapor tube encompassing the axis, a cooler comprising a cooling spiral receiving a coolant and connected to a cooling circuit to form a flow path, and a distillate flask to receive the distillate, with the vapor tube connecting the distilling flask to the cooler and the distillate flask, the distilling flask being heated by a heater, the distilling flask being rotational around the axis by a drive during the heating process, and the vapor guided through the vapor tube and condensed at the cooling spiral can be collected in the distillate flask.

The invention further relates to a method for evaporating a material to be distilled matter, with the material to be distilled being evaporated at least partially by being inserted into a distilling flask that receives the material to be distilled that is supported rotationally around an axis, with the distilling flask with the material to be distilled being heated by a heater, with the distilling flask being rotated around the axis during the heating process by a drive, with the vapor formed due to heating being guided via a vapor tube encompassing the axis into a cooler, with said cooler comprising a cooling spiral, which is connected to a coolant circuit in order to form a flow path for a coolant, and with a coolant flowing through it, and the vapor condensing at the cooling spiral being collected in a distillate flask.

Such rotary evaporators and methods for evaporating a material to be distilled are known, for example from the professional article M. T. Kramer: *A Rotary Evaporator System And Its Potentials*, G-I-T-Fachz. Lab., 18$^{th}$ Volume, September 1974, page 862ff, and have been largely proven in practice. A feature of the rotary evaporator particularly to be emphasized comprises that by the rotation of the distilling flask during the heating process, the material to be distilled is heated more evenly compared to conventional methods, particularly by a wide-range precipitation of the interior wall of the distilling flask with the material to be distilled. Thus, such rotary evaporators serve very well in lab technology.

From WO 96/05901 a method is known for regulating and controlling a distillation or condensing apparatus comprising a boiler, a heat source, and a cooler, with the cooling water circulating through the cooler accepting its temperature in the circuit and when it reaches an upper temperature limit, it is replaced by adding cold water until a lower temperature limit is reached. Here, a defined cut-off can be set if, in spite of inserting cold water, any reduction of the temperature of the cooling water fails to occur.

SUMMARY

The invention is based on the object of providing a rotary evaporator and a method for evaporating a material to be distilled suitable for the use in an automated operation.

In order to attain this object, in a rotary evaporator of the type mentioned at the outset it is provided that a first temperature sensor is arranged at a first position in the flow path of the coolant and a second temperature sensor is arranged at a second position in the flow path, with the first position being spaced apart from the second position by a section of the flow path of the coolant, and that means are provided to determine the flow rate of the coolant through the section. This way, information can be gathered about the present cooling performance of the cooler, which can be used for various processing steps of an automated operation.

The section comprises at least a portion of the section in the flow path of the coolant, in which the coolant accepts the condensation heat emitted during the condensation of the vapor. The section of the flow path can therefore form a real partial section of the cooling spiral. In this case, the temperature sensors are arranged in the cooling spiral inside the cooler.

It is particularly beneficial if the section is selected as large as possible, and particularly comprises the cooling spiral. This way it is achieved that the influence of the measurement inaccuracies during the temperature measurement are kept small compared to the temperature differences measured between the temperature sensors.

For a determination of the temperature of the coolant entering the cooler as precise as possible it may be provided that the first temperature sensor is arranged at the inlet of the cooling spiral into the cooler. The temperature sensor is therefore arranged in the area of the inlet of the coolant line of the cooling circuit into the cooler, forming the flow path, with the position of the temperature sensor being selected such that any falsification of the temperature measurement due to environmental influences is avoided, for example by heating or cooling of a part of the coolant line between the cooling spiral and the temperature sensor due to environmental influences.

Additionally, it may be provided that the second temperature sensor is arranged at the outlet of the cooling spiral out of the cooler. Here, too, the arrangement of the temperature sensor is selected in the flow path such that any change in temperature of the coolant after having left the cooling spiral and prior to reaching the temperature sensor is practically excluded. This may also be achieved by suitable heat insulation of the pipes of the cooling spiral in these sections.

For any statement concerning the cooling performance it is necessary to know the amount of coolant transported through the cooler per time unit. The determination of the flow rate of the coolant can occur, for example, by predetermining a flow rate, for example by predetermining a pressure in the cooling circuit and limiting the flow rate in the flow path, or by measuring the actual flow rate. An embodiment in which the actual flow rate can be measured may provide that the means for determining the flow rate of the coolant through the section of the flow path of the coolant comprises a flow meter.

Here, it is particularly beneficial when the flow meter in the flow path of the coolant is arranged outside the temperature measurement section of the flow path of the coolant. This way, any falsification of the measured temperature difference is avoided in reference to the actual temperature change caused by the cooling in the cooling spiral and/or the section due to the flow meter, particularly its heat radiation and head emissions, or by a heating of the coolant in the flow meter. It is further advantageous that the flow meter remains more easily accessible in an arrangement outside the section, for example for maintenance or control measures.

Particularly beneficial conditions develop during the evaporation of the product to be distilled if the cooler is connected to a vacuum generator.

An embodiment of the invention may provide that means for the determination and/or detection of the temporal progression of the temperature difference between the first and the second temperature sensor and the temporal progression of the flow rate is embodied. Here, it is advantageous that information concerning the changes of the operating state or the features of the material to be distilled can be yielded and used for an automated operation.

For example, it may be provided that means are embodied for the calculation of the distillate collected in the distillate flask within a certain period of time from the temporal progression of the determined temperature difference and from the temporal progression of the flow rate of the coolant through the section of the flow path of the coolant. This way, the rotary evaporator can be operated for example in an automated fashion until a predetermined amount of distillate has been obtained.

For an embodiment of the rotary evaporator to process various materials to be distilled it may be provided that means are provided to input and/or save and/or select product-specific information of the material to be distilled and/or the distillate and/or the coolant. Preferably such material-specific data is at least provided by statements concerning the specific thermal capacity of the coolant and/or the distillate, the condensation enthalpy of the distillate, and/or the effectiveness of the transfer of condensation heat into heating of the coolant. From this data the amount of heat can be determined that is fed to the coolant in the cooling circuit per time unit which is equivalent to the heat released during the condensation of the vapor into distillate. Here, the amount of heat results from the amount of coolant, its temperature change, and its specific heat capacity, based on known laws of physics.

It has shown that in the area of the operating temperature of the coolant its heat capacity can be changed only slightly. In this case, the temperature of the coolant is not included in the calculation but it can be assumed to be constant. Thus, an advantageous embodiment provides that only the difference between the temperatures at the first and the second temperature sensor is determined.

In order to perform automated processing at the rotary evaporator, a control unit can be provided, by which a control signal can be deduced for the rotary evaporator from the temporal progression of the temperature difference between the first and the second temperature sensors and the temporal progression of the determined flow rate. This way, the information about the operating status and/or process progression yielded during the operation of the rotary evaporator can be used for an automatic control by evaluating and utilizing the control signals generated by the control.

According to one embodiment of the invention it may be provided that means are embodied for monitoring the temporal progression of the determined temperature difference for temporal changes, particularly computing means, and that using said means information can be gathered from the temporal progression of the determined temperature difference and the temporal progression of the determined flow rate concerning the beginning and/or the end of the evaporation of a component of the distillation matter, with the control signal being able to output this information and/or the change of the heating performance of the heater and/or the pressure in the system. Here, it is advantageous that changes in the operation of the rotary evaporator can be detected. For example, the temperature difference may drop to zero at the end points of the cooling spiral or the section when the component of the material to be distilled located in the distilling flask has evaporated entirely or when the material to be distilled remaining in the distilling flask forms an azeotropic, with its evaporation temperature being altered in reference to the evaporation temperature of the components. This way, the shut-off may be triggered for the heater or the rotary evaporator and/or a change of the pressure may be caused in the system via the control signal.

In order to attain this object in a method of the type mentioned at the outset, it is provided that the difference of the temperatures of the coolant between two points in the flow path of the coolant, which are spaced apart from each other by a section of the flow path of the coolant is determined continuously or at regular intervals and that the flow rate of the coolant through the cooling spiral is continuously determined or at regular intervals. The intervals of the repeated determination and/or detection may be predetermined, for example, by the clock frequency of a processing unit.

According to one embodiment of the invention it may be provided that a control signal can be deduced for the rotary evaporator from the temporal progression of the determined temperature difference and the temporal progression of the flow rate determined. Here it is advantageous that information concerning the progression of the evaporation process and/or changes in the evaporation process can be determined and utilized.

A determination of the amount of heat accepted by the coolant as precise as possible is achieved if the cooling circuit from its input into the cooler to its outlet out of the cooler is selected as the section for the cooling spiral.

In order to support the evaporation it may be provided that during the heating process the cooler is impinged with a vacuum, particularly via a vacuum generator. A vacuum pump may be used as a vacuum generator, for example.

For an automated execution of the method it may be provided that the control signal influences at least one operating parameter of the rotary evaporator, particularly the heating performance and/or heater temperature of the heater, the pressure in the system of the rotary evaporator and/or the flow rate of the coolant. Here, it is advantageous that the method can be performed automatically with beneficial, particularly optimized operating parameters, and the operating parameters may be subsequently adjusted in an automated fashion during the progression of the method.

According to one embodiment of the invention it may be provided that the amount distilled and collected in the distillate flask is determined from the temporal progression of the determined temperature difference and the temporal progression of the determined flow rate and that the control signal causes the output of the determined value for the distilled amount.

An advantageous embodiment of the invention may provide that information is gathered from the temporal progression of the determined temperature difference and the temporal progression of the determined flow rate concerning the beginning and/or the end of the evaporation of a component of the material to be distilled, with the control signal causing the output of this information and/or the change of the heating performance of the heater and/or the pressure in the system. The invention uses the knowledge that no condensation occurs in the cooler prior to the beginning and after the end of the evaporation and thus the temperature difference at the cooling spiral is equal to zero or almost zero. Here, it is also advantageous that the rotary evaporator during operation can be protected from destruction or damage, for example during the heating of the material to be distilled due to the complete consumption of the available component of the material to be distilled provided for evaporation. Accordingly, the beginning of boiling or evaporation of unknown samples can be also determined, in particular.

Additionally, changes of the material mixture used as material to be distilled during the distillation i.e. during evaporation can be determined because these changes lead to changes in the boiling temperature and/or in the condensation energy, by which the determined temperature difference changes. This change can be evaluated and used for generating a control signal to exchange the distillate flask and/or to cancel the distillation.

In order to reach short operating times until the predetermined amount of distillate is yielded it may be provided that information is gathered from the temporal progression of the determined temperature difference and the temporal progression of the determined flow rate concerning the utilization of the cooler, with the control signal causing the output of said information and/or the control signal regulating the operating parameters of the rotary evaporator, particularly the heating performance of the heater, the pressure in the system of the rotary evaporator, and/or the flow rate of the coolant such that the utilization of the cooler is optimized, particularly that it amounts to a predetermined value and/or that the vapor is kept from reaching the vacuum generator. With the control of the temperature difference between the first and the second position in the flow path of the coolant via the pressure in the cooler and/or the temperature in the heater the distillation speed can be adjusted to the maximally possible cooling performance of the cooler, particularly in case of a predetermined flow rate of coolant. This way, a temporal optimization of the distillation is possible depending on the available cooling performance.

In one embodiment according to the invention it may be provided that during the determination of the distilled amount collected in the distillate flask the specific heat capacity of the coolant and/or the distillate, the condensation enthalpy of the distillate, and/or the effectiveness of the conversion of the condensation heat into the heating of the coolant can be considered. The method can therefore be adjusted and used for a multitude of various distillation matters and/or for a multitude of various distillation processes. Thus, a control of the distillation amount can be implemented. Due to the fact that the specific heat capacity of the coolant in the operating areas of the cooler are only slightly temperature dependent it may be considered to be constant. Temperature variations in the coolant at the inlet into the cooler have only minor effects.

A particularly simple embodiment of the method, which already shows satisfactory results for many applications, may provide that the control signal is determined from the difference of the determined temperature difference and a target temperature difference.

BRIEF DESCRIPTION OF THE DRAWING

The invention is now described in greater detail using an exemplary embodiment; however, it is not limited thereto. Additional exemplary embodiments are discernible for one trained in the art by combining the features of the exemplary embodiment with each other or with features of the claims.

FIG. 1 shows a sketch illustrating the principle of a rotary evaporator according to the invention.

DETAILED DESCRIPTION OF THE PREFERRED EMBODIMENT

A rotary evaporator, marked 1 in its entirety, has a distilling flask 4 supported rotationally around an axis 2. The distilling flask receives a material to be distilled 3.

A vapor tube 5 is connected to the distilling flask 4 and thus connected to its interior. This vapor tube 5 is aligned such that it encompasses the axis 2 and thus is safe from hindering the rotary motion of the distilling flask 4.

The rotary evaporator 1 further comprises a cooler 6. The vapor tube 5 opens at the lower end 24 of the cooler 6 in the interior chamber of the cooler 6. A cooling spiral 8 is arranged in said interior chamber. The cooling spiral 8 is connected to the cooling circuit, not shown in greater detail, in order to form a flow path 7. The flow path 7 is filled with a coolant, which during operation flows along the flow path 7 in order to perform cooling.

In order to collect the distillate 10, the rotary evaporator 1 has a distillate flask 9. The vapor tube 5 opens in a T-shaped fashion in a connection tube 22 between the interior chamber of the cooler 6 and the interior of the distillate flask 9, by which the vapor tube 5 connects the distillation flask 4 to the cooler 6 and the distillate flask 9.

The distillation flask 4 can be heated by a heater 11. The heater 11 is embodied in a known fashion and heats the distillation flask 4 via a water bath.

During the heating process the distillation flask 4 is rotated by a drive 12 around the axis 2.

The vapor 13 created by heating the material to be distilled 3 can therefore be guided through the vapor tube 5 and condensed at the cooling spiral 8. The distillate flask 9 is arranged in a known fashion such that it can collect the condensed vapor 13 in the distillate flask 9.

In order to determine the heating of the coolant in the cooling spiral a first temperature sensor 15 is arranged at a first position 14 in the flow path 7 of the coolant and a second temperature sensor 17 is arranged at a second position 16 in the flow path 7 of the coolant. The first location 14 is here spaced apart from the second position 16 by a section 18 of the flow path 7 of the coolant.

Means 19 are provided to determine the flow rate of the coolant through the section 18.

In the described exemplary embodiment the first temperature sensor 15 is arranged at the cooling spiral 8 in the cooler 6. The second temperature sensor 17 is arranged at the outlet 16 of the cooling spiral 8 from the cooler 6. The positions of the temperature sensors are selected such that the determined temperatures correctly reflect the heating of the coolant by the condensation of the vapor 13 to the extent possible without being falsified by any influence of the environment upon the temperature of the coolant.

A flow meter 19 is arranged in the flow path 7 in order to determine the flow rate of the coolant through the section 18 of the cooling medium flow path 7. In the exemplary embodiment, the flow meter 19 has an impeller driven by the flowing coolant and this way reflecting the flow rate.

The flow meter 19 is arranged in the flow path 7 of the coolant outside the section 18 of the flow path 7 of the coolant.

The cooler 6 is connected at its head 23 via a connection tube 21 to a vacuum generator 20. The vacuum generator 20 impinges the interior chamber of the cooler 6 with a vacuum.

Means not shown in greater detail to determine and/or detect the temporal progression of the temperature difference between the first 15 and the second 17 temperature sensor and the temporal progression of the flow rate are embodied at the rotary evaporator 1. These means also comprise storage means or a memory, in which the determined and/or detected temporal progressions can be saved.

Further, means not shown in greater detail are also embodied to calculate the distillate 10 collected in the distillate flask 9 within a period from the temporal progression of the determined temperature difference and from the temporal progression of the flow rate of the coolant through the section 18 of the flow path 7 of the coolant.

For this purpose, the rotary evaporator 1 comprises additional means, not shown, to input and/or store and/or select material-specific data of the material to be distilled 3 and/or the distillate 10 and/or the coolant. In particular, the specific heat capacity of the coolant and the distillate 10, the condensation enthalpy of the distillate 10 can be predetermined and the effectiveness of the conversion of the condensation heat into the heating of the coolant can be stored.

For an automatic regulation of the evaporation process the rotary evaporator 1 comprises a control unit, by which a control signal can be deduced for the rotary evaporator 1 from the temporal progression of the temperature difference between the first 15 and the second 17 temperature signal. For this purpose, the temporal progression of the flow rate determined can be considered.

A controller is embodied at the rotary evaporator 1 to monitor the temporal progression of the determined temperature difference for temporal changes. Using this means, information can be gathered from the temporal progression of the determined temperature difference and, if applicable, the temporal progression of the determined flow rate concerning the beginning and/or the end of the evaporation of a component of the distillation matter 3. A control signal then causes the output of said information and a change of the heating performance of the heater 11 and/or the pressure in the system.

Using the rotary evaporator 1 a method can be performed to evaporate a material to be distilled, which is explained in greater detail in the following.

The material to be distilled 3 by at least partial evaporation is inserted into the distillation flask 4. The distillation flask 4 is supported rotationally around the axis 2 and embodied to collect the distillation matter 3. Subsequently the distillation flask 4 with the material to be distilled 3 is heated via the heater 11. For this purpose, the distillation flask 4 is partially immersed in the water bath of the heater 11. The heater 11 heats the water of the water bath and regulates its temperature to a predetermined value, at which a component of the material to be distilled 3 evaporates.

During the heating process the distillation flask 4 is rotated around the electrically driven drive 12 around the axis 2, in order to achieve an even and rapid heating. The vapor 13 forming by way of heating is guided via the vapor tube 5 encompassing the axis 2 into the cooler 6. Instead of the vapor 13, the term steam is also common.

The cooler 6 comprises in its interior chamber a cooling spiral 8. The cooling spiral 8 is connected to a coolant circuit. This way, a cooling path 7 is formed for the coolant, in which coolant flows through the cooling spiral 8.

The vapor 13 condensed at the cooling spiral 8 is collected in the distillate flask 9.

During the process the difference of the temperatures of the coolant is continuously or in repeated intervals determined between two locations 14, 16 in the flow path 7 of the coolant, distanced from each other by the section 18 of the flow path 7 of the coolant, and the flow rate of the coolant is determined from said section 18 on a continuous basis or in repeated intervals. The cooling spiral 8, from its inlet 14 into the cooler 6 to its outlet 16 out of the cooler 6, is selected as the section 18 of the coolant circuit.

During the heating process, the cooler 6 and the entire distillation system is impinged with a vacuum from the vacuum generator 20.

A control signal is deduced for the rotary evaporator 1 from the temporal progression of the determined temperature difference and the temporal progression of the determined flow rate. Said control signal comprises several information units and is transferred as a multi-component signal serially via at least one communications channel or parallel via several communications channels.

This control signal influences an operating parameter of the rotary evaporator 1, for example the heating power of the heater 11, the pressure in the cooler 6, and/or the flow rate of the coolant.

The distilled amount, collected in the distillate flask 9, is determined from the temporal progression of the determined temperature difference and the temporal progression of the determined flow rate. The control signal results in an output of the determined value for the distilled amount.

Further, information is gathered concerning the beginning and/or the end of the evaporation of a component of the material to be distilled 3 from the temporal progression of the determined temperature difference and the temporal progression of the determined flow rate. The control signal causes the output of said information on a display. The control signal also causes the change of the heating power of the heater 11. This way, the heating power, particularly the operating temperature of the water bath or the heater 11 and/or the pressure in the system are adjusted to the evaporating temperature of the component to be evaporated.

Information is gathered from the temporal progression of the determined temperature difference and the temporal progression of the determined flow rate about the utilization of the cooler 6. The control signal causes the output of said information. The control signal controls the operating parameters of the rotary evaporator 1, particularly the heating power of the heater 11, the pressure in the system of the rotary evaporator 1, and/or the flow rate of the coolant such that the utilization of the cooler 6 is optimized. Here, the temperature difference at the cooling spiral 8 is monitored and the operating parameters are modified such that vapors are condensed only over a length of approximately 80%, i.e. from 70% to 90% or from 75% to 85% or precisely 80% of the length of the cooling spiral 8, measured prior to entering the cooler 6. The temperature difference equivalent to this utilization of the cooler 6 is determined for the rotary evaporator 1 prior to operation by way of experiments and stored in the control. These tests occur by varying the operating parameters under the visual control of the condensation processes at the cooling spiral 8, particularly the size of the section of the cooling spiral 8, at which vapor 13 condenses. By the adjustment to the predetermined value it is achieved that the vapor 13 is prevented from entering the vacuum generator 20. It is known that above a certain temperature difference at the cooling spiral 8, depending on operating parameters of the rotary evaporator 1, particularly the cooler 6, a quantitative condensation of the distillate 10 is no longer possible. When the cooler 6 is overstrained in its performance in this way, vapor 13 exits the cooler 6 and is lost from the process.

When determining the amount of matter distilled and collected in the distillate flask 9 the specific heat capacity of the coolant and the distillate 10, the condensation enthalpy of the distillate 10, and the effectiveness of the conversion of the condensation heat into heating the coolant are considered. From the temperature difference determined at the cooling spiral 8 and using the knowledge of the flow rate through the cooling spiral 8 the heat amount accepted by the coolant per time unit is determined. This is equivalent to the heat amount emitted during condensation of the vapor 13. This way, the amount of condensed distillate 10 can be calculated from the condensation enthalpy of the distillate 10 and the calculated heat amount. For many materials, instead of the exact specific values, preset standard values may also be used.

The control and monitoring of the utilization of the cooler 8 calculates the difference $Z = X - Y$ of the determined temperature difference X at the cooling spiral 8 and a target-temperature difference Y and uses Z as the variable.

At the starting point of the distillation the actual value X of the temperature difference at the cooling spiral 8 is almost zero because no vapor 13 condenses at the cooling spiral 8. Now, a target value Y is selected for the temperature difference. The heating power in the heater 11 and/or the pressure in the system is adjusted to the predetermined target-temperature difference Y. This way, the desired amount of distillate is produced.

In the rotary evaporator 1 with a cooler 6, temperature sensors 15, 17 are arranged in the inlet 14 and the outlet 16 of the coolant into and/or out of the cooler 6, and the flow rate of the coolant through the cooler 6 is determined. The beginning and/or the end of the condensation in the cooler 6 is deduced from the increase and/or reduction of the difference of the temperatures X at the temperature sensors 15, 17. The amount of the condensed distillate 10 is determined from the difference of the temperatures X and a control of the distillation amount is performed. The utilization of the cooler 6 is controlled by controlling the heating power of the heater 11 and/or the pressure in the system depending on the difference of the temperatures X.

The invention claimed is:

1. A method for evaporating a material to be distilled, comprising:
   inserting the material to be distilled (3) by at least partial evaporation into a distilling flask (4), the distilling flask being supported rotationally around an axis (2), heating the distilling flask (4) with the material to be distilled (3) via a heater (11), and rotating the distilling flask (4) during the heating process around the axis (2) by a drive (12),
   guiding vapor (13) forming due to the heating process via a vapor tube (5) encompassing the axis (2) into a cooler (6), the cooler (6) comprising a cooling spiral (8) connected to a cooling circuit to form a flow path (7) for a coolant and with said coolant flowing through it, and condensing the vapor (13) at the cooling spiral (8) and collecting distillate in a distillate flask (9),
   determining a difference between temperatures of the coolant continuously or in repeated intervals between two positions (14, 16) in the flow path (7) of the coolant, spaced apart from each other by a section (18) of the flow path (7) of the coolant,
   determining a flow rate, using a flow meter (19), of the coolant from said section (18) continuously or in repeated intervals, wherein a control signal is deduced for the rotary evaporator (1) from a temporal progression of the determined temperature difference and a temporal progression of a determined flow rate, and
   determining an amount distilled and collected in the distillate flask (9) from the temporal progression of the determined temperature difference and the temporal progression of the determined flow rate and the control signal initiates an output of a value determined for the distilled amount.

2. A method according to claim 1 wherein the cooling spiral (8) from an inlet (14) thereof into the cooler (6) to an outlet (16) therefrom out of the cooler (6) is selected as the section (18) of the coolant circuit.

3. A method according to claim 1, further comprising during the heating process impinging the cooler (6) with a vacuum.

4. A method according to claim 1, wherein the control signal influences at least one operating parameter of the rotary evaporator (1), selected from the group consisting of: a heating power of the heater (11), pressure in the system of the rotary evaporator (1), and a flow rate of the coolant.

5. A method according to claim 4, wherein information is gathered from the temporal progression of the determined temperature difference and the temporal progression of the determined flow rate concerning at least one of a beginning or an end of the evaporation of a component of the material to be distilled (3), with the control signal initiating at least one of an output of said information or a change of heating power of the heater (11), or a change of pressure in the system.

6. A method according to claim 1, wherein information is gathered from the temporal progression of the determined temperature difference and the temporal progression of the determined flow rate about utilization of the cooler (6), with the control signal at least one of initiating an output of said information or the controlling the operating parameters of the rotary evaporator (1).

7. A method according to claim 1, wherein a specific heat capacity of at least one of the coolant or the distillate (10), a condensation enthalpy of the distillate (10), or an effectiveness of conversion of a condensation heat into heating of the coolant are considered for determination of a distilled amount collected in the distillate flask (9).

8. A method according to claim 1, wherein the control signal is determined by a difference (Z) of the determined temperature difference (X) and a target temperature difference (Y).

9. A rotary evaporator comprising:
   a distilling flask (4) for receiving a material to be distilled (3) and supported rotationally around an axis (2),
   a vapor tube (5) encompassing the axis (2), having a cooler (6) comprising:
      a cooling spiral (8) that forms a flow path (7) connected to a cooling circuit and receiving a coolant, and having a distillate flask (9) to collect distillate (10), with the vapor tube (5) connecting the distilling flask (4) to the cooler (6) and the distillate flask (9), the distilling flask (4) is heatable by a heater (11), the distilling flask (4) being rotational during the heating process around the axis (2) by a drive (12), and the vapor (13) being guided through the vapor tube (5), condensed at the cooling spiral (8) and collected in the distillate flask (9),
   a first temperature sensor (15) is located at a first position (14) in the flow path (7) of the coolant and a second temperature sensor (17) is located at a second position (16) in the flow path (7) of the coolant, with the first position (14) being spaced apart from the second position (16) by a section (18) of the flow path (7) of the coolant,
   a flow sensor, comprising a flow meter (19) being provided to determine the flow rate of the coolant through the section (18),
   means for determining or detecting a temporal progression of a temperature difference between the first (15) and the second (17) temperature sensors and a temporal progression of the flow rate and
   means for calculating the distillate (10) collected in the distillate flask (9) in a certain period from the temporal progression of the temperature difference determined and from the temporal progression of the flow rate of the coolant through the section (18) of the flow path (7) of the coolant.

10. A rotary evaporator according to claim 1, wherein the first temperature sensor (15) is located at an inlet (14) of the cooling spiral (18) in the cooler (6).

11. A rotary evaporator according to claim 1, wherein the second temperature sensor (17) is located at an outlet (16) of the cooling spiral (8) out of the cooler (6).

12. A rotary evaporator according to claim 1, wherein the flow meter (19) in the flow path (7) of the coolant is arranged outside the section (18) of the flow path (7) of the coolant.

13. A rotary evaporator according to claim 1, wherein the cooler (6) is connected to a vacuum generator (20).

14. A rotary evaporator according to claim 1, wherein means are provided for at least one of entering, saving or selecting material-specific data for at least one of the material to be distilled (3) or the distillate (10) or the coolant.

15. The rotary evaporator according to claim 1, wherein a control unit is provided, by which a control signal can be deduced for the rotary evaporator (1) from the temporal progression of the temperature difference between the first (15) and the second (17) temperature sensors and the temporal progression of the determined flow rate.

16. A rotary evaporator according to claim 15, wherein the control unit monitors the temporal progression of the determined temperature difference for temporal changes and that using said means from the temporal progression of a determined temperature difference and the temporal progression of determined flow rate determines information concerning at least one of a beginning or an end of the evaporation of a component of the material to be distilled (3), with at least one of said information or a change in heating power of the heater (11) or pressure in the system being output via the control signal.

* * * * *

UNITED STATES PATENT AND TRADEMARK OFFICE
CERTIFICATE OF CORRECTION

PATENT NO.         : 8,894,822 B2                                    Page 1 of 1
APPLICATION NO.    : 13/122848
DATED              : November 25, 2014
INVENTOR(S)        : Hubert Pinhack and Martin Spath It is certified that error appears in the above-identified patent and that said Letters Patent is hereby corrected as shown below:

In the Claims

In claim 10, at column 10, line 62, after the words "according to", delete "claim 1" and insert therefor --claim 9--.
In claim 11, at column 10, line 65, after the words "according to", delete "claim 1" and insert therefor --claim 9--.
In claim 13, at column 11, line 4, after the words "according to", delete "claim 1" and insert therefor --claim 9--.
In claim 14, at column 11, line 6, after the words "according to", delete "claim 1" and insert therefor --claim 9--.
In claim 15, at column 11, line 10, after the words "according to", delete "claim 1" and insert therefor --claim 9--.

Signed and Sealed this
Thirtieth Day of June, 2015

Michelle K. Lee
*Director of the United States Patent and Trademark Office*